(12) United States Patent
Charbit et al.

(10) Patent No.: US 8,594,562 B2
(45) Date of Patent: Nov. 26, 2013

(54) METHODS, COMPUTER PROGRAM PRODUCTS AND APPARATUS PROVIDING IMPROVED USE OF RELAYS IN WIRELESS COMMUNICATION

(75) Inventors: Gilles Charbit, Hampshire (GB); Olav Emerik Tirkkonen, Helsinki (FI)

(73) Assignee: Nokia Corporation, Espoo (FI)

( * ) Notice: Subject to any disclaimer, the term of this patent is extended or adjusted under 35 U.S.C. 154(b) by 785 days.

(21) Appl. No.: 12/665,452

(22) PCT Filed: Jun. 20, 2008

(86) PCT No.: PCT/IB2008/052458
§ 371 (c)(1),
(2), (4) Date: May 11, 2010

(87) PCT Pub. No.: WO2008/155744
PCT Pub. Date: Dec. 24, 2008

(65) Prior Publication Data
US 2010/0317284 A1    Dec. 16, 2010

Related U.S. Application Data

(60) Provisional application No. 60/936,769, filed on Jun. 21, 2007.

(51) Int. Cl.
*H04B 7/15* (2006.01)
(52) U.S. Cl.
USPC ............................ 455/11.1; 455/13.1; 455/16
(58) Field of Classification Search
USPC ................ 455/3.02, 427, 428, 430, 431, 7–9,
455/11.1, 12.1, 13.1, 13.2, 14–17;
340/425.1; 370/226, 293, 246, 274,
370/279, 315, 316, 492, 501
See application file for complete search history.

(56) References Cited

U.S. PATENT DOCUMENTS

| 5,541,979 A | 7/1996 | Leslie et al. |
| 5,659,879 A | 8/1997 | Dupuy |

(Continued)

FOREIGN PATENT DOCUMENTS

| EP | 1608195 A | 12/2005 |
| GB | 2301734 A | 12/1996 |
| WO | 2004013978 A | 2/2004 |

OTHER PUBLICATIONS

International Search Report and Written Opinion from PCT/IB2008/052458, dated Feb. 12, 2009, 21 pages.

(Continued)

*Primary Examiner* — Dominic E Rego
(74) *Attorney, Agent, or Firm* — Harrington & Smith (57) ABSTRACT

In one exemplary embodiment, an apparatus (50) includes: means for determining (52) a source timing parameter for a source node (70) and a relay timing parameter for a relay node (60), wherein the relay node (60) is disposed between the source node (70) and the apparatus (50); first means for transmitting (56) the relay timing parameter to the relay node (60); and second means for transmitting (56) the source timing parameter and the relay timing parameter to the source node (70). In another exemplary embodiment, an apparatus (70) includes: first means for receiving (76) a first timing parameter; second means for receiving (76) a second timing parameter; first means for transmitting (76) a message to a first node (60) in accordance with the first timing parameter; and second means for transmitting (76) the message to a second node (50) in accordance with the first and second timing parameters.

19 Claims, 6 Drawing Sheets

(56) References Cited

U.S. PATENT DOCUMENTS

| | | | |
|---|---|---|---|
| 2007/0150928 A1 | 6/2007 | Hottinen | |
| 2007/0201392 A1* | 8/2007 | Ramachandran | 370/315 |
| 2009/0073916 A1* | 3/2009 | Zhang et al. | 370/315 |
| 2010/0009624 A1* | 1/2010 | Youn et al. | 455/9 |

OTHER PUBLICATIONS

Office Action from corresponding European Patent Office Action 08763409.3, dated Oct. 22, 2010, 9 pages.
Aggelos Bletsas, Andy Lippman, "Implementing Cooperative Diversity Antenna Arrays with Commodity Hardware", IEEE Communication Magazines, Dec. 2006, vol. 44, No. 12.
A. Sendonaris, B. Aazhang, "User Cooperation Diversity—Part II: Implementation Aspects and Performance Analysis", IEEE Trans. Com, vol. 51, No. 11, Nov. 2003.
Laneman J.N., Wornell, G.W., "An efficient Protocol for Realizing Co-operative Diversity in Wireless Networks", IEEE International Symposium on Information Theory, Jun. 2001, p. 294.
A. Sendonaris, B. Aazhang, "User Cooperation Diversity—Part I: System Description", IEEE Trans. Com, vol. 51, No. 11, Nov. 2003.
Office Action received in corresponding European EPT Application No. 08763409.3, Dated Feb. 8, 2012, 6 pages.

"International Search Report and The Written Opinion of the International Searching Authority", received in corresponding PCT Application No. PCT/IB2008/052458, Dated Jun. 20, 2008, 54 pages.
IPwireless: "Paging Group Indication" 3GPP Draft; R2071927, 3rd Generation Partnershp Project (3GPP), Mobile Competence Centre; 650, Route Des Lucioles; F-06921 Sophia-Antipolis Cedex; France; vol. tsg-ran\WG2_RL2\TSGR2_58\Documents, No. Kobe, Japan; May 7, 2007.
LG Electronics: "Transmission of LTE Paging, 3GPP TSG-RAN WG2 #58", Internet Citation, May 7, 2007; Retrieved from the Internet: URL:http://www.3gpp.org/ftp/tsg_ran/WG2_RL2\TSGR2_58/Documents/.
Section 6.5 of 3GPP (S1.24), V0.1.0, "TDD, Physical Layer Procedures Description," TSG RAN WG1#2 (99)130, Feb. 1999, (12 pages).
3GPP TR 25.912, V7.1.0, (Sep. 2006), Technical Report, $3^{rd}$ Generation Partnership Project' Technical Specification Group Radio Access Network; Feasibility Study for Evolved Universal Terrestrial Radio Access (UTRA) and Universal Terrestrial Radio Access Network (UTRAN), (Release 7), (57 pages).

* cited by examiner

METHODS, COMPUTER PROGRAM PRODUCTS AND APPARATUS PROVIDING IMPROVED USE OF RELAYS IN WIRELESS COMMUNICATION

RELATED APPLICATION

This application was originally filed as PCT Application No. PCT/IB2008/052458 filed Jun. 20, 2008 which claims priority to US Provisional Application No. 60/936,769 filed Jun. 21, 2007.

TECHNICAL FIELD

The exemplary embodiments of this invention relate generally to wireless communication systems and, more specifically, relate to the use of relays in such systems.

BACKGROUND

The following abbreviations are utilized herein:

| | |
|---|---|
| 3G | third generation of GSM-based mobile networks |
| 3GPP | third generation partnership project |
| BS | base station |
| CDMA | code division multiple access |
| CQI | channel quality indicator |
| DL | downlink (Node B to UE) |
| E-UTRAN | evolved universal terrestrial radio access network |
| FDMA | frequency division multiple access |
| GI | guard interval |
| GSM | global system for mobile communications |
| HARQ | hybrid automatic repeat-request |
| IMT-A | international mobile telephony-advanced |
| LTE | long term evolution of UTRAN |
| MBMS | multimedia broadcast/multicast service (3GPP) |
| Node B | base station |
| OFDMA | orthogonal frequency division multiple access |
| PAR | peak-to-average ratio |
| PARR | peak-to-average ratio reduction |
| RAN | radio access network |
| SFN | single frequency network |
| TA | timing advance |
| TDD | time division duplex |
| TDMA | time division multiple access |
| UE | user equipment, such as a mobile station or mobile terminal |
| UL | uplink (UE to Node B) |
| UTRAN | universal terrestrial radio access network |
| WAN | wide area network |
| WCDMA | wideband code division multiple access |
| WiMAX | worldwide interoperability for microwave access (IEEE 802.16 standard) |
| WLAN | wireless local area network |

The use of relays and co-operative diversity is being considered for the next generation of wireless communication systems, such as for E-UTRAN (also referred to as LTE or UTRAN-LTE) and in IMT-A research. While some investigations have focused on fixed relay stations (i.e., where the relay stations are considered a part of the RAN), the use of UEs as relay stations is also being considered, particularly for the UL. In the UL, one aspect of UE relaying is that a UE source may transmit data directly to a Node B destination in a conventional manner and also transmit to the Node B indirectly via a number of relays. At the Node B destination, joint decoding may be performed in order to combine the received signals It is known in the art, for example, to use TA with a TDD system. Reference in this regard may be made to Section 6.5 of 3GPP (S1.24), V0.1.0, "TDD, Physical Layer Procedures Description," TSG RAN WG1#2 (99)130, February 1999. As described in S1.24, the timing of transmissions from a UE are advanced with respect to the timing of signals received from the Node B to compensate for round trip propagation delay. The Node B determines the TA for the UE by measuring the timing of a transmission from the UE. The Node B subsequently signals the UE its TA.

In the development of E-UTRAN, it is presently assumed that the UL will contain both TDMA and FDMA aspects. Furthermore, and at least partially due to the TDMA aspects, the use of TA in the UL is similarly anticipated. Reference in this regard may be made to Sections 7.2 and 13.9 of 3GPP TR 25.912, V7.1.0, 3rd Generation Partnership Project; Technical Specification Group Radio Access Network; Feasibility study for evolved Universal Terrestrial Radio Access (UTRA) and Universal Terrestrial Radio Access Network (UTRAN) (Release 7)," September 2006.

SUMMARY

The below summary section is intended to be merely exemplary and non-limiting.

In one exemplary embodiment of the invention, a method comprising: determining, by a destination node, a source timing parameter for a source node and a relay timing parameter for a relay node, wherein the relay node is disposed between the source node and the destination node in a wireless communication system; transmitting the determined relay timing parameter from the destination node to the relay node; and transmitting the determined source timing parameter and the determined relay timing parameter from the destination node to the source node.

In another exemplary embodiment, an apparatus comprising: means for determining a source timing parameter for a source node and a relay timing parameter for a relay node, wherein the relay node is disposed between the source node and the apparatus in a wireless communication system; first means for transmitting the determined relay timing parameter to the relay node; and second means for transmitting the determined source timing parameter and the determined relay timing parameter to the source node.

In another non-limiting, exemplary embodiment, a program storage device readable by a machine, tangibly embodying a program of instructions executable by the machine for performing operations, said operations comprising: determining, by a destination node, a source timing parameter for a source node and a relay timing parameter for a relay node, wherein the relay node is disposed between the source node and the destination node in a wireless communication system; transmitting the determined relay timing parameter from the destination node to the relay node; and transmitting the determined source timing parameter and the determined relay timing parameter from the destination node to the source node.

In another non-limiting, exemplary embodiment, an apparatus comprising: a processor configured to determine a source timing parameter for a source node and a relay timing parameter for a relay node, wherein the relay node is disposed between the source node and the device in a wireless communication system; and a transmitter configured to transmit the determined relay timing parameter from the destination node to the relay node and to transmit the determined source timing parameter and the determined relay timing parameter from the destination node to the source node.

In another exemplary embodiment, a method comprising: receiving, by a source node, a first timing parameter and a second timing parameter; transmitting a message from the source node to a first node in accordance with the first timing parameter; and transmitting the message from the source node to a second node in accordance with the first timing parameter and the second timing parameter.

In another exemplary embodiment, an apparatus comprising: first means for receiving a first timing parameter; second means for receiving a second timing parameter; first means for transmitting a message to a first node in accordance with the first timing parameter; and second means for transmitting the message to a second node in accordance with the first timing parameter and the second timing parameter.

In another non-limiting, exemplary embodiment, a program storage device readable by a machine, tangibly embodying a program of instructions executable by the machine for performing operations, said operations comprising: receiving, by a source node, a first timing parameter and a second timing parameter; transmitting a message from the source node to a first node in accordance with the first timing parameter; and transmitting the message from the source node to a second node in accordance with the first timing parameter and the second timing parameter.

In another non-limiting, exemplary embodiment, an apparatus comprising: a receiver configured to receive a first timing parameter and a second timing parameter; and a transmitter configured to transmit a message to a first node in accordance with the first timing parameter and to transmit the message to a second node in accordance with the first timing parameter and the second timing parameter.

In another exemplary embodiment, a method comprising: obtaining, by a destination node, location information for a plurality of nodes, wherein the plurality of nodes are located within a coverage area; separating, by the destination node, the plurality of nodes into a plurality of groups based on the location information; and selecting, by the destination node, at least one relay node based on the plurality of groups and a location of a source node within the coverage area.

In another exemplary embodiment, an apparatus comprising: means for obtaining location information for a plurality of nodes, wherein the plurality of nodes are located within a coverage area; means for separating the plurality of nodes into a plurality of groups based on the location information; and means for selecting at least one relay node based on the plurality of groups and a location of a source node within the coverage area.

In another non-limiting, exemplary embodiment, a program storage device readable by a machine, tangibly embodying a program of instructions executable by the machine for performing operations, said operations comprising: obtaining location information for a plurality of nodes, wherein the plurality of nodes are located within a coverage area; separating the plurality of nodes into a plurality of groups based on the location information; and selecting at least one relay node based on the plurality of groups and a location of a source node within the coverage area.

In another non-limiting, exemplary embodiment, an apparatus comprising: a processor configured to obtain location information for a plurality of nodes, wherein the plurality of nodes are located within a coverage area, to separate the plurality of nodes into a plurality of groups based on the location information, and to select at least one relay node based on the plurality of groups and a location of a source node within the coverage area; and a transmitter configured to transmit the selected at least one relay node to another device.

BRIEF DESCRIPTION OF THE DRAWINGS

The foregoing and other aspects of exemplary embodiments of this invention are made more evident in the following Detailed Description, when read in conjunction with the attached Drawing Figures, wherein.

DETAILED DESCRIPTION

Wireless communication systems, such as 3G and LTE cellular networks, for example, may be coverage-limited on the UL. This is partly due to cost considerations relating to the power amplifier in the handset. These cost considerations are not easily solved, even with modulations having a low PAR and/or using PARR techniques. UL coverage may be improved by using relays in a co-operative diversity mode with joint decoding at the Node B to achieve full macro-diversity gain. The data signals from the direct link and indirect link(s) should be separated or multiplexed and ideally received substantially simultaneously to avoid buffering at the receiver. Thus, the source node (e.g., a UE source) and UE relay(s) should be synchronized. Synchronization in the time domain or frequency domain is typically assumed in conventional implementations. However, there is a need to achieve time synchronization with practical complexity in the UE source, UE relays and Node B.

Typical relay demonstrators assume that relays use a preamble-based frame and time their initial transmission towards the destination on channel strength estimated from destination pilots. Reference in this regard may be made to Bletsas et al., "Implementing Cooperative Diversity Antenna Arrays with Commodity Hardware," IEEE Communication Magazines, Vol. 44, No. 12, December 2006. One problem with this approach is that it does not utilize the fact that, for example, in a conventional cellular network, the UEs are already synchronized with the destination (e.g., the Node B in the UL).

Protocols based on a known frame timing at the source, relays and destination(s) are also described in conventional literature. Reference in this regard may be made to Sendonaris et al., "User Cooperation Diversity—Part II: Implementation Aspects and Performance Analysis," IEEE Trans. Com, Vol. 51, No. 11, November 2003. One problem with this approach is that it assumes that synchronization and channel estimation are already acquired by some means.

The exemplary embodiments of the invention provide improvements in the use of relays in wireless communication systems. In one exemplary embodiment, timing parameters are determined and signaled to respective nodes, as further described below, for example, to enable data signals transmitted by a source and a relay to arrive at a destination at substantially the same time.

Figure 1:
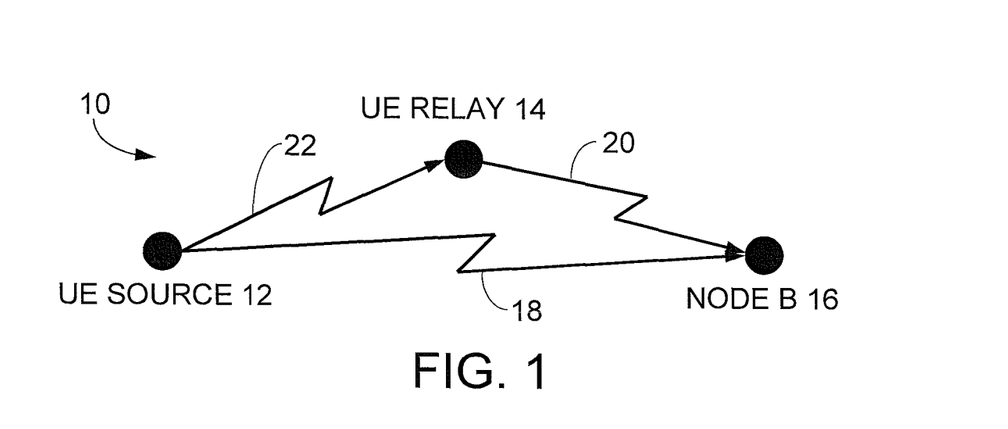
FIG. 1 shows an exemplary E-UTRAN system within which the exemplary embodiments of the invention may be practiced.

FIG. 1 shows an exemplary E-UTRAN system 10 within which the exemplary embodiments of the invention may be practiced. The system 10 includes a UE source 12, a UE relay 14 and a Node B 16. The UE relay 14 is disposed between the UE source 12 and the Node B 16. The wireless connections shown in FIG. 1 depict the paths for UL communications between the UE source 12 and the Node B 16. While FIG. 1 only shows the UL communication paths, it should be appreciated that the connections may be bidirectional.

In one exemplary embodiment, the Node B 16 determines TA parameters for the UE source 12 and the UE relay 14. As a non-limiting example, the TA parameters may be determined using conventional techniques, such as by performing measurements on or comparing the timing of one or more UE transmissions. The Node B 16 sets the TA parameters in such a way that data signals transmitted by the UE source 12 and the UE relay 14 on the UL (i.e., to the Node B 16) arrive at the Node B 16 at substantially the same time (e.g., within a predefined or determined error).

As utilized herein, the direct path, link, transmission or communication refers to communications sent directly from one of the destination node (e.g., the Node B 16) or the source node (e.g., the UE source 12) to the other node. For example, in FIG. 1, communication link 18 comprises the direct link. Furthermore, the indirect path, link, transmission or communication refers to communications sent from one of the destination node (e.g., the Node B 16) or the source node (e.g., the UE source 12) to the other node via one or more relays (e.g., via UE relay 14). For example, in FIG. 1, the pathway along the two communication links 20, 22 comprises the indirect link. For purposes of brevity, the indirect link may also be referred to simply by designation of the portion that terminates at the destination node (e.g., link 20). It should be understood that such a reference in fact corresponds to the entire path, via the one or more relay nodes, from the destination node to the source node.

The Node B 16 then signals the UE relay TA parameter, $TA_R$, to the UE relay 14. The Node B 16 signals both the UE source TA parameter, $TA_S$, and the $TA_R$ to the UE source 12. Since the UE source 12 is aware of both TA parameters, $TA_R$ and $TA_S$, the UE source 12 can achieve coarse time synchronization with the UE relay 14. The UE source 12 and the UE relay 14 use the TA parameters to time their transmissions to the Node B 16 (i.e., UL transmissions). For example, by knowing the $TA_R$, the UE source 12 can time its transmission to the Node B 16 (i.e., the transmission that is otherwise based on the $TA_S$) such that both the direct transmission 18 and the indirect transmission 20, 22 (via the UE relay 14) arrive at the Node B 16 at substantially the same time. As non-limiting examples, the signals 18, 20 received by the Node B 16 may be jointly decoded and/or combined using time domain multiplexing, frequency domain multiplexing or code domain multiplexing. The selection of a suitable combining technique (e.g., multiplexing technique) may be dependent on various factors, such as complexity, cost concerns (e.g., cost of relays or relay components) and network planning, as non-limiting examples.

In one non-limiting, exemplary embodiment, the Node B 16 determines the TA parameters as follows. The Node B 16 broadcasts a message on a DL synchronization channel. Upon reception of the broadcast, each UE 12, 14 synchronizes its clock based on the broadcast message. Each UE 12, 14 also transmits a reply message back to the Node B 16. The Node B 16 receives the reply messages and determines the TA parameters based on the timing of the reply messages (e.g., based on the difference in time between the broadcast and reception of the respective reply messages).

In other exemplary embodiments, it may be desirable for the UE relay 14 to have (i.e., know or be aware of) the UE source TA parameter ($TA_S$). In such a case, in addition to the $TA_R$, the Node B 16 would signal the $TA_S$ to the UE relay 14. Such an exemplary embodiment is further described below with respect to FIG. 2.

Figure 2:
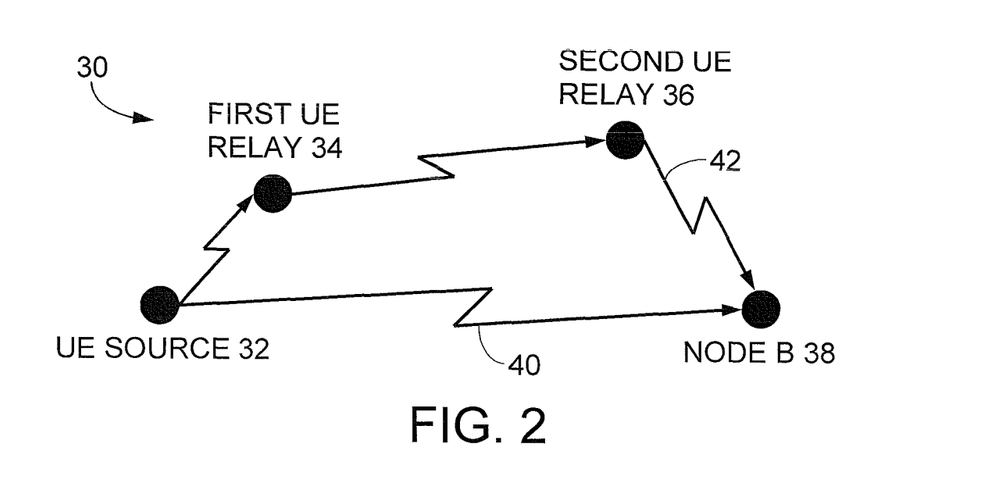
FIG. 2 illustrates another exemplary E-UTRAN system within which the exemplary embodiments of the invention may be practiced.

FIG. 2 shows another exemplary E-UTRAN system 30 within which the exemplary embodiments of the invention may be practiced. The system 30 includes a UE source 32, a first UE relay 34, a second UE relay 36 and a Node B 38. The UE relays 34, 36 are disposed between the UE source 32 and the Node B 38. The wireless connections shown in FIG. 2 depict the paths for UL communications between the UE source 32 and the Node B 38. While FIG. 2 only shows the UL communication paths, it should be appreciated that the connections may be bidirectional. In comparison to the system 10 shown in FIG. 1, the system 30 of FIG. 2 has two intermediate UE relays 34, 36 instead of one UE relay 14.

The Node B 38 determines TA parameters for the UE source 32 ($TA_S$), the first UE relay 34 ($TA_1$) and the second UE relay 36 ($TA_2$). The Node B then signals all of the determined TA parameters (i.e., $TA_S$, $TA_1$ and $TA_2$) to all of the UEs (i.e., the UE source 32, the first UE relay 34 and the second UE relay 36). With this knowledge, the UE source 32, the first UE relay 34 and the second UE relay 36 can transmit at such time intervals so as to ensure that UL data signals in the direct link 40 and the indirect link 42 (via the UE relays 34, 36) arrive substantially simultaneously at the Node B 38.

In some exemplary embodiments, the TA parameters may be determined using conventional techniques, such as the one described in 3GPP (S1.24), V0.1.0, as a non-limiting example.

While FIGS. 1 and 2 illustrate exemplary E-UTRAN systems 50, 70, in other exemplary embodiments, different wireless communication systems may be utilized. In further exemplary embodiments, the relay(s) may not comprise UEs. For example, one or more fixed relays may be used. As another non-limiting example, the relays may comprise mobile relays that are not UEs. In other exemplary embodiments, the destination node may not comprise a Node B or BS. For example, the destination node may comprise another UE. In further exemplary embodiments, the source node may not comprise a UE. For example, the source node may comprise a BS or Node B. In other exemplary embodiments, one or more of the connections between the various nodes may not comprise bidirectional links. For example, one or more of the connections may be unidirectional (e.g., a multicast or broadcast link, such as a MBMS transmission, for example). In further exemplary embodiments, one or more timing parameters other than TA parameters may be used. In other exemplary embodiments, a different number of relays may be utilized. In further exemplary embodiments, the arrangement of the system may be other than the arrangements depicted in FIGS. 1 and 2.

To further generalize discussion of the exemplary embodiments of the invention, below figures may generally refer to various nodes, identifying the nodes by number or letter. It should be appreciated that respective nodes may comprise any suitable electronic device that is capable of and configured to operate in the manner as described, for that node, by the exemplary embodiments of the invention. For example, generally, the exemplary embodiments of the invention may be utilized in any wireless communication system having a source node, a destination node and at least one relay node disposed therebetween.

Figure 3:
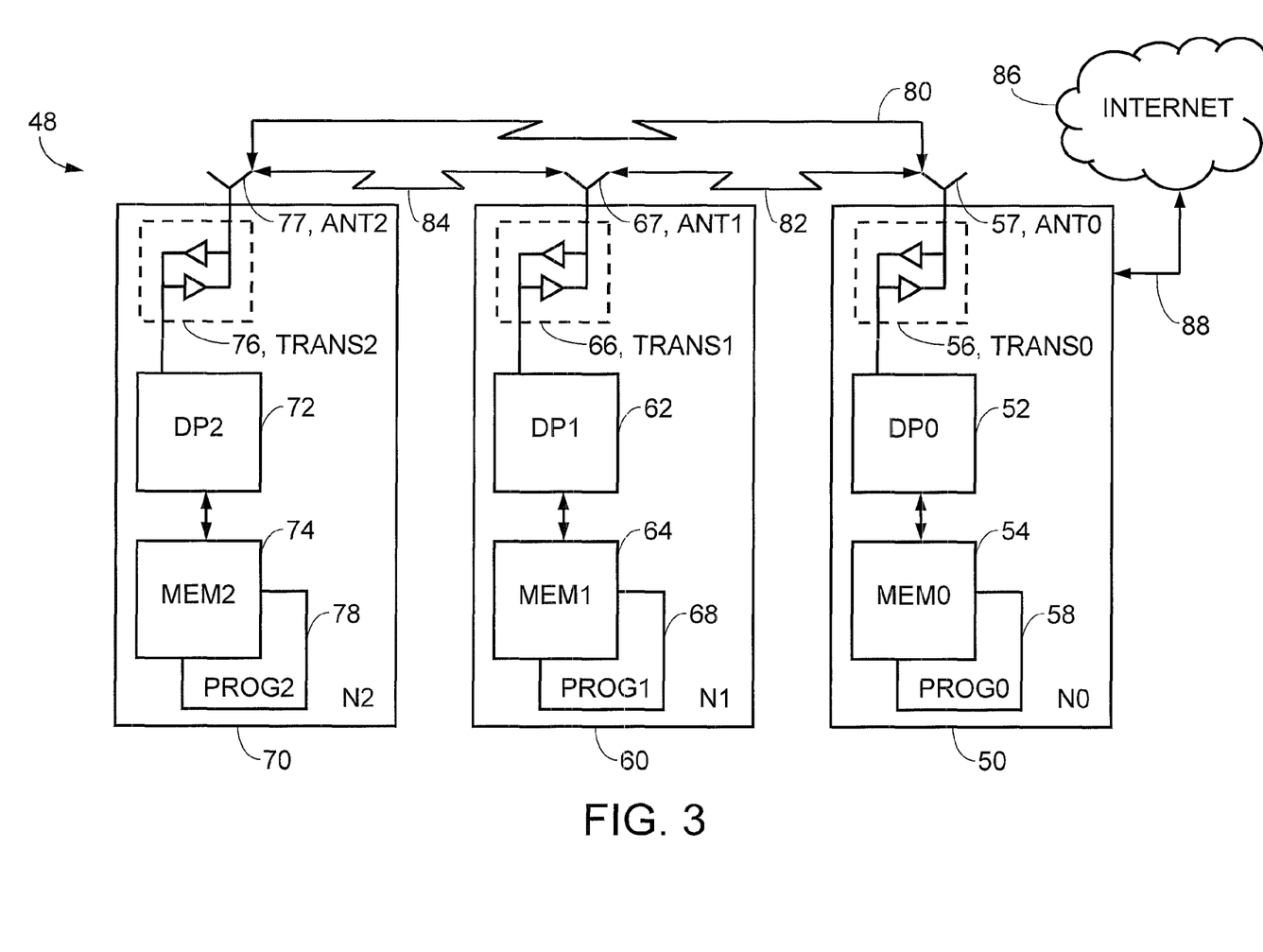
FIG. 3 shows a simplified block diagram of various electronic devices that are suitable for use in practicing the exemplary embodiments of this invention.

Reference is made to FIG. 3 for illustrating a simplified block diagram of various electronic devices that are suitable for use in practicing the exemplary embodiments of this invention. In FIG. 3, a wireless communication system 48 includes a Node0 (N0) 50, a Node1 (N1) 60 and a Node2 (N2) 70. As non-limiting examples, the wireless communication system 48 may comprise a network, a cellular network (e.g., a TDMA system, a FDMA system, a CDMA system, a CDMA2000 system, a WCDMA system, an OFDMA system, a 3G system, an E-UTRAN), a WAN, a WLAN, a Bluetooth® system or a WiMAX system.

The N0 50 includes: a data processor (DP0) 52; a memory (MEM0) 54 coupled to the DP0 52; a suitable RF transceiver (TRANS0) 56 (having a transmitter (TX) and a receiver (RX)) coupled to the DP0 52; and a suitable antenna (ANT0) 57 coupled to the TRANS0 56. The MEM0 54 stores a program (PROG0) 58. The TRANS0 56 is capable of wireless communication with both the N2 70 (via a direct link 80) and the N1 60 (via an indirect link 82). The N0 50 may comprise a Node B, a BS, an access node, an access gateway or a UE, as non-limiting examples. The N0 50 generally corresponds to the destination node, as discussed elsewhere herein.

In some exemplary embodiments, the N0 50 may be coupled to other electronic devices, such as one or more Node Bs, BSs, access gateways, access nodes, network nodes or networks. As a non-limiting example, the N0 50 may be coupled to the inter et 86 via a communication link 88. In other exemplary embodiments, one or both of the N1 60 and the N2 70 can access the internet 86 by communicating with the N0 50.

The N1 60 includes: a data processor (DP1) 62; a memory (MEM1) 64 coupled to the DP1 62; a suitable RF transceiver (TRANS1) 66 (having a transmitter (TX) and a receiver (RX)) coupled to the DP1 62; and a suitable antenna (ANT1) 67 coupled to the TRANS1 66. The MEM1 64 stores a program (PROG1) 68. The TRANS1 66 is capable of wireless communication with both the N0 50 (via the indirect link 82) and the N2 70 (via another link 84). The N1 60 may comprise a Node B, a BS, an access node, an access gateway, a network node or a UE, as non-limiting examples. The N1 60 generally corresponds to the relay node, as discussed elsewhere herein.

The N2 70 includes: a data processor (DP2) 72; a memory (MEM2) 74 coupled to the DP2 72; a suitable RF transceiver (TRANS2) 76 (having a transmitter (TX) and a receiver (RX)) coupled to the DP2 72; and a suitable antenna (ANT2) 77 coupled to the TRANS2 76. The MEM2 74 stores a program (PROG2) 78. The TRANS2 76 is capable of wireless communication with both the N0 50 (via a direct link 80) and the N1 60 (via the other link 84). The N2 70 may comprise a Node B, a BS, an access node, an access gateway or a UE, as non-limiting examples. The N2 70 generally corresponds to the source node, as discussed elsewhere herein.

At least one of the PROGs 58, 68, 78 is assumed to include program instructions that, when executed by the associated DP, enable the electronic device(s) to operate in accordance with the exemplary embodiments of this invention, as discussed herein.

In general, the various embodiments of the nodes 50, 60, 70 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The exemplary embodiments of this invention may be implemented by computer software executable by one or more of the DPs 52, 62, 72 of the nodes 50, 60, 70, or by hardware, or by a combination of software and hardware. As a non-limiting example, the exemplary embodiments of the invention may be implemented by circuitry, one or more processors, one or more processing blocks and/or one or more integrated circuits.

The MEMs 54, 64, 74 may be of any type suitable to the local technical environment and may be implemented using any suitable data storage technology, such as semiconductor-based memory devices, magnetic memory devices and systems, optical memory devices and systems, fixed memory and removable memory, as non-limiting examples. The DPs 52, 62, 72 may be of any type suitable to the local technical environment, and may include one or more of general purpose computers, special purpose computers, microprocessors, digital signal processors (DSPs) and processors based on a multi-core processor architecture, as non-limiting examples.

The configuration of the system and devices shown in FIG. 3 is provided only as one non-limiting example. One of ordinary skill in the art will appreciate other configurations that may be utilized in conjunction with aspects of the exemplary embodiments of the invention. As non-limiting examples of such other configurations, one or more of the nodes 50, 60, 70 may comprise any suitable number of data processors, memories, transceivers and/or antennas. Furthermore, the wireless communication system 48 may comprise additional nodes, such as additional UEs, BSs, access nodes or relay nodes, as non-limiting examples. Although shown in FIG. 3 as bidirectional, one or more of the links 80, 82, 84 may comprise a unidirectional link. As a non-limiting example, the other link 84 may comprise a unidirectional link such that the N1 60 does not receive communications from the N2 70.

As a non-limiting example, multiple relay stations may use any suitable method of cooperative diversity transmission. In one exemplary embodiment, SFN-type transmission is assumed. This means that the UEs that are transmitting the same data transmit using the same resources, the same transport format (e.g., the same coding (including scrambling, spreading, etc.), modulation, interleaving) and the same pilot transmissions. In such an embodiment, there may not be a need for frequency synchronization.

In some exemplary embodiments, a transmission method with a GI may be used, such as single-carrier FDMA transmission with a cyclic prefix or OFDMA, as non-limiting examples.

Figure 4:
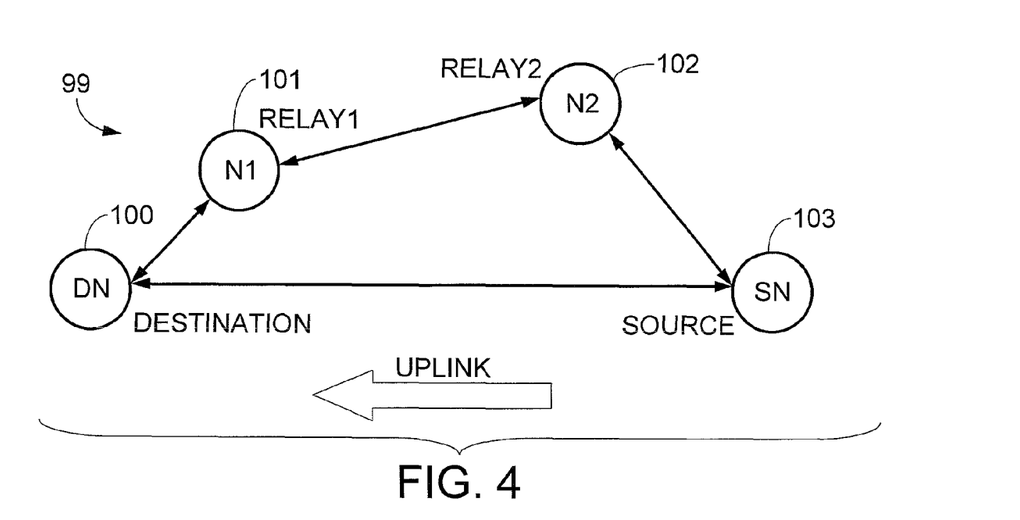
FIGS. 4 and 5 show another exemplary wireless communication system within which the exemplary embodiments of the invention may be practiced.
Figure 5:
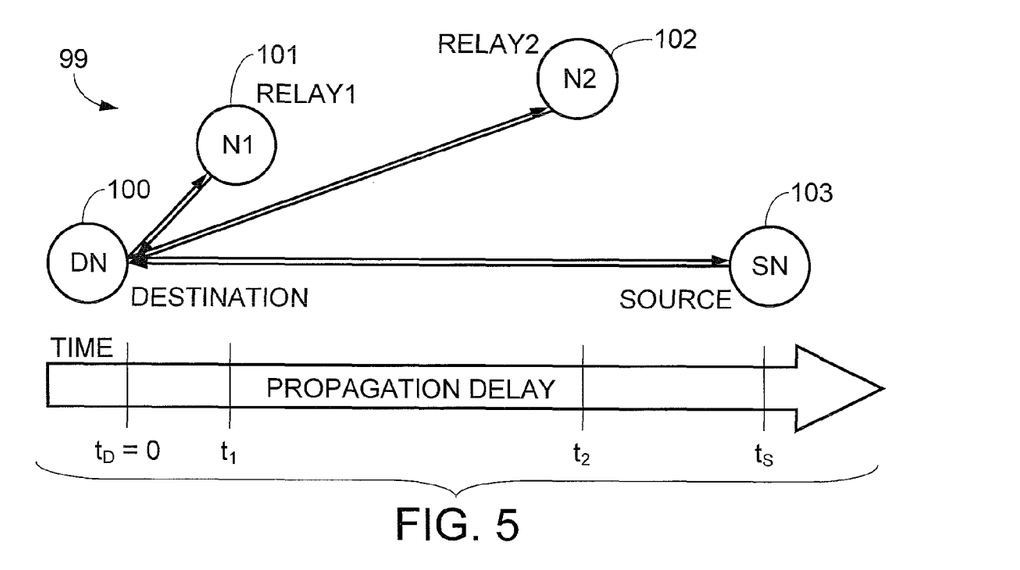
Figure 6:
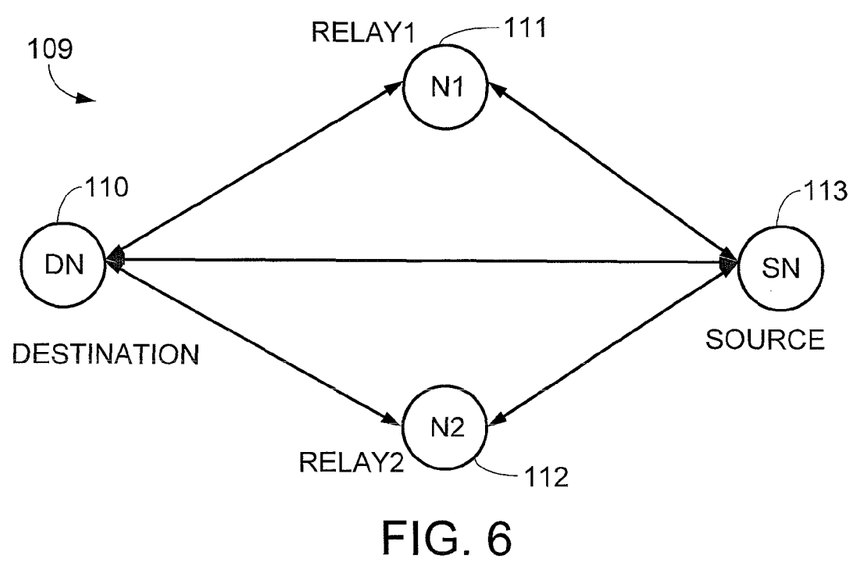
FIG. 6 depicts another exemplary wireless communication system within which the exemplary embodiments of the invention may be practiced.

FIGS. 4-6 will be referred to below in discussing various exemplary embodiments of the invention and aspects thereof. FIG. 4 shows another exemplary wireless communication system 99 within which the exemplary embodiments of the invention may be practiced. The system 99 includes a destination node (DN) 100, a first relay node (N1) 101, a second relay node (N2) and a source node (SN) 103 with the N1 101 and the N2 102 disposed between the DN 100 and the SN 103, as shown in FIG. 4. As a non-limiting example, the DN 100 may comprise a BS or Node B, in which case the UL direction would be as indicated in FIG. 4. As a non-limiting example, the SN 103, N1 101 and N2 102 may each comprise a different UE.

As shown in FIG. 5, first, each one of the SN 103, N1 101 and N2 102 synchronizes its clock based on a transmission (e.g., a broadcast) from the DN 100. As a non-limiting example, the DN 100 may broadcast a message on a DL synchronization channel. Also as shown in FIG. 5, each one of the SN 103, N1 101 and N2 102 replies to the transmission from the DN 100 by sending a reply message. The DN 100 receives a reply message from each one of the SN 103, N1 101 and N2 102.

The DN 100 can use the reply messages to determine a timing parameter for each device. For example, the DN 100 may determine a $TA_S$ for the SN 103, a $TA_1$ for the N1 101 and a $TA_2$ for the N2 102. As a non-limiting example, the TA may be based on the respective propagation delay (time) for the node. As a further non-limiting example, if each node replies to the transmission from the Node B without delay, the propagation time for a message from the Node B to the respective node (i.e., one-way) will be approximately half of the time difference between the Node B transmitting the message and the Node B receiving a corresponding reply (i.e., half the round-trip time). As shown in FIG. 5, let the propagation time for N1 101 be $t_1$, for N2 102 be $t_2$ and for SN 103 be $t_S$, with a time $t_D=0$ corresponding to the time the message is transmitted from the Node B.

It may be desirable to determine the TAs such that if the nodes N1 101, N2 102 and SN 103 transmit in the same time slot/frame, their symbols are received almost simultaneously (e.g., within TA accuracy) by the DN 100. As a non-limiting example, the TA for a node may correspond to a quantization of the propagation delay between the respective node and the DN 100, normalized such that if the respective node begins a transmission at a time—TA (relative to the clock of the DN 100), the transmission will be received by the DN 100 at a time 0 (according to the clock of the DN 100). In such an example, $TA_N=t_N$ or a quantized value close to $t_N$.

Once the timing parameters are determined, the DN 100 signals each relay node 101, 102 at least with its respective timing parameter. The DN 100 also signals the SN 103 with the timing parameter for itself as well as the timing parameter for at least one of the relay nodes 101, 102. It may be desirable to signal the source node (SN 103) with the timing parameters for itself and all of the relay nodes being used for indirect communications from the source node (SN 103) to the destination node (DN 100).

Two non-limiting, exemplary alternatives, identified as "Alternative 1" and "Alternative 2," are presented below. These alternatives are for synchronizing a source node-to-relay node hop (e.g., the hop from SN 103 to N2 102). For example, this hop may be optimized for transmission from the source node to the relay nodes.

Alternative 1:

The source-to-relay hop may be synchronized so that the signals are received at the relay nodes approximately with the same timing as DL signals are received at these nodes. In this case, the relay nodes do not need any additional timing information to synchronize the source-to-relay hop. That is, each relay node only needs to know the respective timing parameter (e.g., TA) for itself. Even so, in other exemplary embodiments that use Alternative 1, it may be desirable to inform each relay node of timing parameters for other nodes.

Coarse synchronization may be acquired by synchronizing the transmission at the source node (e.g., SN 103). For this, the source node (e.g., SN 103) would need an estimate of the timing parameters (e.g., TAs) for the transmission to the relay(s) (e.g., N1 101 and N2 102). These timing parameters could be signaled to the source node based on the timing parameters calculated at the destination node for the relay nodes.

FIG. 6 shows another exemplary wireless communication system 109 within which the exemplary embodiments of the invention may be practiced. The system 109 includes a first relay node (N1) 111 and a second relay node (N2) disposed between a destination node (DN) 110 and a source node (SN) 113. As can be seen in FIG. 6, the N1 111 and the N2 112 are both separated from the SN 113 by approximately the same distance. If the TA for the relay nodes 111, 112 were calculated as described above (where $TA_N=t_N$ or a quantization close to $t_N$), the SN 113 could synchronize with both relay nodes 111, 112.

However, if the timing parameters of multiple relay nodes are different, for example, as in the system 99 shown in FIG. 5, the source node transmission cannot be perfectly synchronized for all relay nodes. In such a case, the source node could determine which relay is more important to synchronize with. Note that in systems with GIs, perfect synchronization may not be required. The GI may be dimensioned to accommodate maximum delay spreads in the system. For a relay hop, the delay spread is likely to be shorter than for the maximum distance in the cell. Thus, a relay hop can accommodate more timing inaccuracy than, for example, a long hop from an edge-of-cell device.

Assume that the system 99 utilizes a GI. In such a system with a sufficiently long GI, it may be more harmful for a signal to arrive too early than too late. As such, and by way of example, the SN 103 could use a $TA=TA_S-TA_2$ if $TA_2>TA_1$. To accomplish this, the DN 100 could signal the SN 103 with the TA to be used. In other exemplary embodiments, the DN 100 may signal the SN 103 with all of the determined TA values and the SN 103 could determine, from the TAs, what TA it should use.

Note that in some exemplary embodiments, the signal on the source-to-relay hop might typically arrive at the relay somewhat later than the relay expects it. The timing according to $TA_S-TA_1$, for example, would be substantially exact if the relay lies directly on the path between the source node and the destination node. It is likely that the relay node will not be on the direct path. Thus, the destination node may use a statistical margin, and signal a slightly larger value than $TA_1$ to the source node to be used for timing the source-to-relay transmission.

In other exemplary embodiments, the destination node may use additional information to determine the TAs, such as location estimates, to make a more accurate estimation of the best TA to be used for the transmission on the source-to-relay hop. This estimation may subsequently be signaled to the relay nodes.

Alternative 2:

The source-to-relay hop may be synchronized such that the signals are transmitted by the source node with the same timing at which a signal directed to the destination node would be transmitted.

For example, the relay nodes could use their own TAs directly to synchronize the relay links. Assume that a relay node may start receiving at the same time as it would start transmitting if it were transmitting. For example, if a relay node lay directly on the path between the source node and the destination node, the signal transmitted from the source node based on the $TA_S$ would reach the relay node at the same time which the relay node would start transmitting if it were on its own (i.e., using its own TA). Thus, no additional signaling would be needed for coarse synchronization (i.e., for the source-to-relay hop).

Similarly as in Alternative 1, it may be beneficial to use a statistical margin when synchronizing the relay hops. This margin, or a set of such margins, may be signaled, for example, as system information, or may be hard coded in a standard, as non-limiting examples.

Also similar as described above for Alternative 1, in other exemplary embodiments, the destination node may use additional information to determine the TAs, such as location estimates, to make a more accurate estimation of the best TA to be used for the transmission on the source-to-relay hop. This estimation may subsequently be signaled to the relay nodes.

Alternative 1 may be particularly desirable in a system where the relay stations receive FDM UL and DL transmissions simultaneously. These may be DL/UL relay messages or normal DL transmissions, as non-limiting examples. Such a situation might occur for certain combinations of UL/DL and relay duplexing techniques.

Alternative 2 may be particularly desirable in a system where the relay hops are FDM. For example, in FIG. 6, assume that the DN 110 is receiving a transmission from N1 111 on one frequency channel or physical resource block. Also assume that simultaneous with this reception, the DN 110 is also receiving a transmission from N2 112 on an adjacent channel. If a SN 113 transmission is received at the DN 110 with the same synchronization as one or both of the other UL transmissions, the interference between these signals will be minimized.

Note that in some exemplary embodiments, transmissions from a relay to the destination node are always transmitted using the TA of the respective relay.

Alternative 2 may also be particularly desirable in a system where relays are TDM on the UL. This allows for the use of relays with half-duplex capability for simpler design and lower implementation cost. In broadcast mode (BC), during time t, SN 113 transmits in BC mode to N1 111, N2 112, and DN 110 on a same frequency channel. The nodes N1 111 and N2 112 do not transmit to DN 110 during the BC mode transmission time, t. DN 110 may receive the SN 113 signal with some reliability. At the end of the BC phase, SN 113 re-transmits the same signal as in the BC phase during a Multiple Access Phase (MAC) transmission time interval t'. N1 111 and N2 112 transmit the signal acquired during the BC phase during time t'. There is no delay in forwarding signals from N1 111 and N2 112 to DN 110, as SN 113, N1 111, and N2 112 can transmit the same data during the MAC phase.

The same principle as described above in Alternative 2 may be used to synchronize DL transmissions on relay-to-relay or relay-to-source hops. This means that each relay times its transmission to start exactly at the times that correspond to the timing of the reception at the DL synchronization signal at the source node. Then, at the destination node, a relay hop is coarsely synchronized with a direct DL transmission. Just as above, one or more statistical margins may be used on a device, cell and/or system basis to account for the fact that relays are usually not on the direct path between the destination node and the source node.

If more than one relay is used for the indirect link, it may be that the joint decoding at the destination node may only be readily performed for the direct link and the final relay-to-destination signal. In such a case, the source node and the final relay may adjust their transmission timing to ensure that these signals arrive at the destination node substantially simultaneously. Transmission timing for intermediate relays may be set for signals to arrive at the next relay in the indirect link accordingly. This may imply that intermediate relay signals arrive at different times in the destination node and may not be readily combined with the direct signal and/or the final relay signal. However, depending on delay requirements, buffering of these signals could be used for joint combining.

In some exemplary embodiments, the best (i.e., preferred) relays for use by the source node (e.g., for co-operative diversity) may be selected. For example, this could be performed in a distributed fashion where the source node chooses the best relays based on measurements, or the destination node indicates the best relays to the source node in a centralized fashion. One of ordinary skill in the art will appreciate the various options available.

Furthermore, the use of separate measurements in the source node and/or relay nodes to determine the best (i.e., preferred) relay(s), once TA-based coarse synchronization is achieved, may help achieve fine time synchronization.

Available methods for relay transmission include amplify and forward and decode and forward, as non-limiting examples.

It is assumed that although the source node and relays may not be in line of sight, they are geographically distributed sufficiently in line of sight such that, using the timing parameters, coarse time synchronization can be achieved. The use of sectorization by the destination node and/or the use of node location estimation (e.g., by the destination node) may be useful, for example, in achieving fine time synchronization or in providing further improvements, as explained below with respect to FIG. 7.

In other exemplary embodiments, the destination node utilizes sectorization and location estimation. Sectorization refers to the division of the destination node's coverage area (e.g., a base station's cell) into a plurality of sectors. Based on nodes' respective location in the coverage area, and in view of the sectorization, the nodes can be divided into different groups or classes, for example, by sector.

Figure 7:
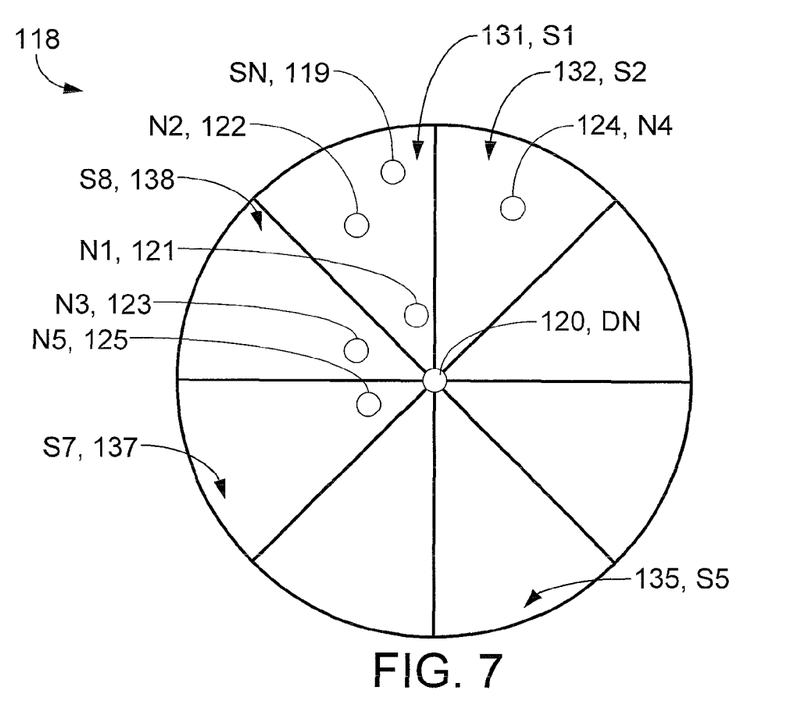
FIG. 7 illustrates an exemplary destination node coverage area with an exemplary sectorization suitable for use in accordance with the exemplary embodiments of the invention.

FIG. 7 illustrates an exemplary destination node coverage area 118 with an exemplary sectorization suitable for use in accordance with the exemplary embodiments of the invention. The coverage area 118 is a circular region centered on a destination node (DN) 120. Within the coverage area 118, there are a number of potential relay nodes including node N1 121, node N2 122, node N3 123, node N4 124 and node N5 125. There is also a source node (SN) 119. The coverage area 118 is divided into a plurality of regions or sectors, including a first sector (S1) 131, a second sector (S2) 132 and an eighth sector (S8) 138. It is assumed that the location of each node has been estimated and that the DN 120 has the location information.

Based on the estimated location of each node and the sectorization of the coverage area, nodes may be placed or assigned to a relay class. For example, nodes whose location is within the area specified by S1 131 are assigned to a first relay class (RC1). As such, nodes N1 121, N2 122 and SN 119 are assigned to RC1. Node N4 124 is assigned to a second relay class (RC2). Node N3 123 is assigned to an eighth relay class (RC8).

This sectorization/classification may be useful in selecting suitable relays to be used for a given source node. For example, since SN 119 belongs to RC1, it is likely that using relay nodes that are also located in RC1 will be more advantageous than using relay nodes located in a fifth relay class (RC5) corresponding to a fifth sector (S5) 135. This is because it is more likely that nodes within a same sector or class are arranged in a more linear fashion from the DN 120 to the SN 119 than nodes from more than one sector/class.

This technique might be utilized in conjunction with TA values, rather than exclusively on TA values. Depending on sector size, relays having a similar TA value could be at a great distance from one another, leading to higher propagation delays than might be expected between nodes having similar TA values. For example, assume that nodes N5 125 and N1 121 have a same TA value. Note, however, that N5 125 is in a fifth sector (S5) 135 while N1 121 is in S1 131. Clearly, it would be preferable to use N1 121 as a relay node for the SN 119 instead of N5 125. This can be expressed utilizing sectors and corresponding classes, for example, as shown above.

In other exemplary embodiments, a different size or shape of coverage area may be utilized. In further exemplary embodiments DN 120 signals each other node with its own timing parameter (e.g., TA parameter) and with the timing parameters for other nodes in the same relaying class or sector. In other exemplary embodiments, nodes in a same sector/relay class determine the distance, relative or absolute, from the DN 120 based on the timing parameters. This enables a SN 119 to identify potential relay nodes and suitably order them (e.g., based on the TAs).

In some exemplary embodiments, transmissions between the source node and the relay node(s) and/or transmissions between the relay nodes take place at a same frequency but at predetermined times. In such a manner, a given device does not transmit and receive at the same time. Thus, half-duplex devices may be used to implement the exemplary embodiments of the invention.

In other exemplary embodiments, it may be assumed that nodes of different relay classes transmit at the same time. Thus, it may be desirable to separate such signals in code or spatial domains to minimize interference. In further exemplary embodiments, nodes of different relay classes cooperate to minimize interference and/or to avoid transmitting at the same time. In other exemplary embodiments, link adaptation (e.g., modulation, coding, transmission modes, HARQ) may be utilized.

Utilizing the above-described sectorization exemplary embodiments, packets can be routed via ad-hoc relays in a distributed fashion.

As can be seen, the exemplary embodiments of the invention provide improvements in the use of relays in wireless communication systems. In one exemplary embodiment, timing parameters are determined and signaled to respective nodes, as further described below, for example, to enable data signals transmitted by a source and a relay to arrive at a destination at substantially the same time.

Exemplary embodiments of the invention may improve coverage and capacity for systems in a distributed or mesh fashion without a need for CQI reporting and/or without Node B centralized packet scheduling. Transmissions from source to relay, relay to relay, and relay to destination are typically low-power and short range. Exemplary embodiments of the invention may be implemented with reasonable complexity as TA parameters are generally known in the Node B and communicated to UEs. In some exemplary embodiments, the Node B may communicate TA parameters of a list of potential relays through signaling, with only a moderate increase in overhead. However, no new measurements would be required to coarsely synchronize the relay hops. In some exemplary embodiments, no additional signaling is needed to coarsely synchronize the relay hops.

Below are provided further descriptions of non-limiting, exemplary embodiments. The below-described exemplary embodiments are separately numbered for clarity and identification. This numbering should not be construed as wholly separating the below descriptions since various aspects of one or more exemplary embodiments may be practiced in conjunction with one or more other aspects or exemplary embodiments.

Figure 8:
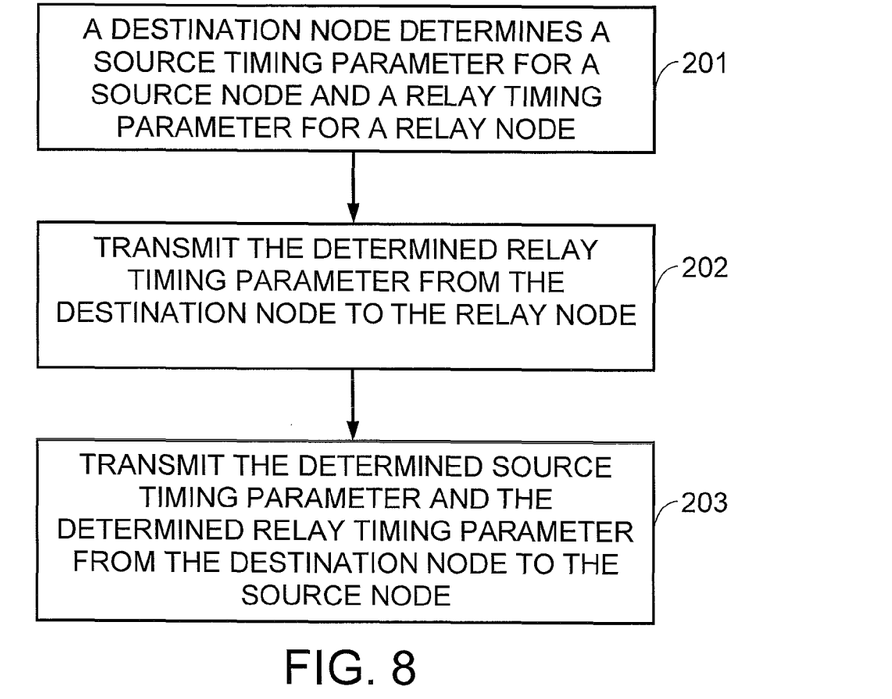
FIG. 8 depicts a flowchart illustrating one non-limiting example of a method for practicing the exemplary embodiments of this invention.

(1) In one non-limiting, exemplary embodiment, and as illustrated in FIG. 8, a method comprising: determining, by a destination node, a source timing parameter for a source node and a relay timing parameter for a relay node, wherein the relay node is disposed between the source node and the destination node in a wireless communication system (201); transmitting the determined relay timing parameter from the destination node to the relay node (202); and transmitting the determined source timing parameter and the determined relay timing parameter from the destination node to the source node (203).

A method as above, where the wireless communication system comprises one of an E-UTRAN, a WLAN or a Bluetooth® system. A method as in any above, where the destination node is configured to receive at least one message from at least one of the relay node or the source node. A method as in any above, where the at least one message is transmitted to the destination node in accordance with at least one of TDMA, FDMA, CDMA and OFDMA techniques.

A method as in any above, where the destination node comprises a base station, a network element, a relay station, a user equipment, a mobile node or a mobile station. A method as in any above, where the relay node comprises a base station, a network element, a relay station, a user equipment, a mobile node or a mobile station. A method as in any above, where the source node comprises a base station, a network element, a relay station, a user equipment, a mobile node or a mobile station. A method as in any above, where the relay node comprises a fixed relay, a fixed relay node or a fixed relay station. A method as in any above, where the relay comprises a mobile relay, a mobile relay node or a mobile relay station.

A method as in any above, where determining comprises performing at least one measurement. A method as in any above, where determining comprises: broadcasting, by the destination node, a broadcast message; receiving, by the destination node, a source reply message from the source node and a relay reply message from the relay node; calculating the source timing parameter based on a timing of the source reply message; and calculating the relay timing parameter based on a timing of the relay reply message.

A method as in any above, further comprising: transmitting the source timing parameter to the relay node. A method as in any above, where the source timing parameter comprises a source TA value and the relay timing parameter comprises a relay TA value. A method as in any above, where the source timing parameter and the relay timing parameter are determined to ensure that data signals transmitted by the source node and the relay node to the destination node arrive at the destination node substantially simultaneously. A method as in any above, where the source timing parameter and the relay timing parameter are determined in order to enable communications transmitted by the source node and the relay node to arrive at the destination node substantially at a same time.

A method as in any above, where the method is implemented by a computer program. A method as in any above, where the method is implemented in accordance with a program storage device readable by a machine, tangibly embodying a program of instructions executable by the machine for performing operations, said operations comprising the steps of performing the method. A method as in any above, and further comprising one or more additional aspects of the exemplary embodiments of the invention as further described herein.

(2) in another non-limiting, exemplary embodiment, a program storage device readable by a machine, tangibly embodying a program of instructions executable by the machine for performing operations, said operations comprising: determining, by a destination node, a source timing parameter for a source node and a relay timing parameter for a relay node, wherein the relay node is disposed between the source node and the destination node in a wireless communication system (201); transmitting the determined relay timing parameter from the destination node to the relay node (202); and transmitting the determined source timing parameter and the determined relay timing parameter from the destination node to the source node (203).

A program storage device as in the previous, where the machine comprises the destination node. A program storage device as in any above, where the machine comprises a base station, a network element, a relay station, a user equipment, a mobile node or a mobile station. A program storage device as in any above, and further comprising one or more additional aspects of the exemplary embodiments of the invention as further described herein, including those mentioned above with respect to number (1).

(3) In another non-limiting, exemplary embodiment, an apparatus comprising: a processor configured to determine a source timing parameter for a source node and a relay timing parameter for a relay node, wherein the relay node is disposed between the source node and the apparatus in a wireless communication system; and a transmitter configured to transmit the determined relay timing parameter from the destination node to the relay node and to transmit the determined source timing parameter and the determined relay timing parameter to the source node.

An apparatus as in the previous, where the apparatus comprises a base station, a network element, a relay station, a user equipment, a mobile node or a mobile station. An apparatus as in any above, further comprising a receiver. An apparatus as in any above, further comprising at least one antenna. An apparatus as in any above, further comprising one or more additional aspects of the exemplary embodiments of the invention as further described herein, including those mentioned above with respect to number (1).

(4) In another non-limiting, exemplary embodiment, an apparatus comprising: means for determining a source timing parameter for a source node and a relay timing parameter for a relay node, wherein the relay node is disposed between the source node and the apparatus in a wireless communication system; first means for transmitting the determined relay timing parameter to the relay node; and second means for transmitting the determined source timing parameter and the determined relay timing parameter to the source node.

An apparatus as in the previous, where the means for determining comprises at least one processor and the first and second means for transmitting comprise at least one transmitter. An apparatus as in any above, where the apparatus comprises a base station, a network element, a relay station, a user equipment, a mobile node or a mobile station. An apparatus as in any above, further comprising means for receiving. An apparatus as in the previous, where the means for receiving comprises a receiver. An apparatus as in any above, further comprising one or more additional aspects of the exemplary embodiments of the invention as further described herein, including those mentioned above with respect to number (1).

(5) In another non-limiting, exemplary embodiment, an apparatus comprising: determination circuitry configured to determine a source timing parameter for a source node and a relay timing parameter for a relay node, wherein the relay node is disposed between the source node and the apparatus in a wireless communication system; first transmission circuitry configured to transmit the determined relay timing parameter from the destination node to the relay node; and second transmission circuitry configured to transmit the determined source timing parameter and the determined relay timing parameter to the source node.

An apparatus as in the previous, where the apparatus comprises a base station, a network element, a relay station, a user equipment, a mobile node or a mobile station. An apparatus as in any above, further comprising receiver circuitry configured to receive a communication or a wireless communication. An apparatus as in any above, further comprising antenna circuitry configured to couple to at least one antenna. An apparatus as in any above, further comprising one or more additional aspects of the exemplary embodiments of the invention as further described herein, including those mentioned above with respect to number (1).

Figure 9:
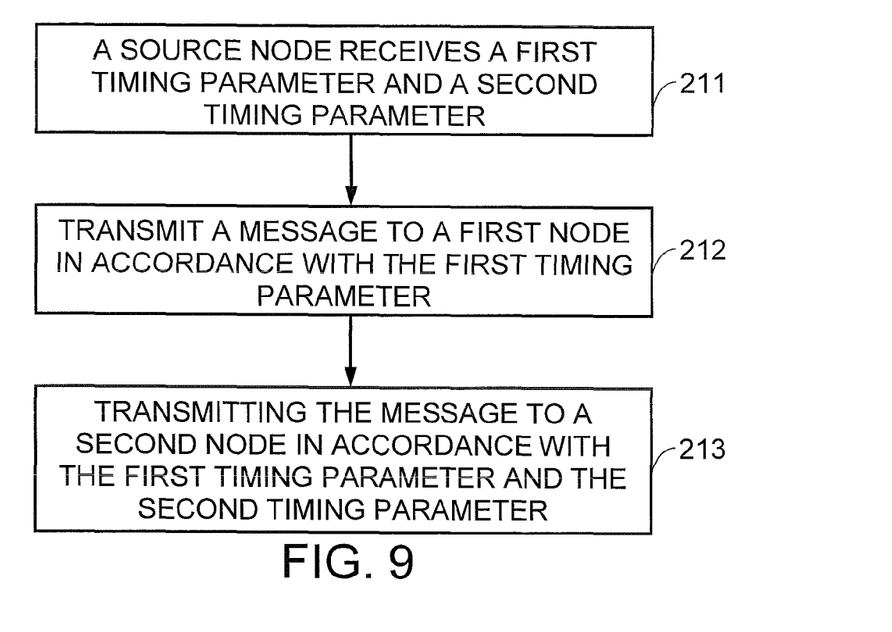
FIG. 9 depicts a flowchart illustrating one non-limiting example of a method for practicing the exemplary embodiments of this invention.

(6) In another non-limiting, exemplary embodiment, and as illustrated in FIG. 9, a method comprising: receiving, by a source node, a first timing parameter and a second timing parameter (211); transmitting a message from the source node to a first node in accordance with the first timing parameter (212); and transmitting the message from the source node to a second node in accordance with the first timing parameter and the second timing parameter (213).

A method as in the previous, further comprising: receiving, by the source node, a broadcast message from the second node; and responding, by the source node, to the broadcast message by transmitting a response message to the second node. A method as in the previous, further comprising: in response to receiving the broadcast message from the second node, synchronizing, by the source node, a clock of the source node. A method as in any above, where the broadcast message is received by the source node on a downlink synchronization channel A method as in any above, where the source node comprises a base station, a network element, a relay station, a user equipment, a mobile node or a mobile station.

A method as above, where the wireless communication system comprises one of an E-UTRAN, a WLAN or a Bluetooth® system. A method as in any above, where the first node comprises a relay node. A method as in any above, where the second node comprises a destination node. A method as in any above, where the first node comprises a base station, a network element, a relay station, a user equipment, a mobile node or a mobile station. A method as in any above, where the second node comprises a base station, a network element, a relay station, a user equipment, a mobile node or a mobile station. A method as in any above, where the source node comprises a base station, a network element, a relay station, a user equipment, a mobile node or a mobile station. A method as in any above, where the relay node comprises a fixed relay, a fixed relay node or a fixed relay station. A method as in any above, where the relay comprises a mobile relay, a mobile relay node or a mobile relay station.

A method as in any above, where the source timing parameter comprises source TA value and the relay timing parameter comprises a relay TA value. A method as in any above, where the source timing parameter and the relay timing parameter are such that data signals transmitted by the source node and the relay node to the destination node arrive at the destination node substantially simultaneously.

A method as in any above, where the method is implemented by a computer program. A method as in any above, where the method is implemented in accordance with a program storage device readable by a machine, tangibly embodying a program of instructions executable by the machine for performing operations, said operations comprising the steps of performing the method. A method as in any above, and further comprising one or more additional aspects of the exemplary embodiments of the invention as further described herein.

(7) In another non-limiting, exemplary embodiment, a program storage device readable by a machine, tangibly embodying a program of instructions executable by the machine for performing operations, said operations comprising: receiving, by a source node, a first timing parameter and a second timing parameter (211); transmitting a message from the source node to a first node in accordance with the first timing parameter (212); and transmitting the message from the source node to a second node in accordance with the first timing parameter and the second timing parameter (213).

A program storage device as in the previous, where the machine comprises the source node. A program storage device as in any above, where the machine comprises a base station, a network element, a relay station, a user equipment, a mobile node or a mobile station. A program storage device as in any above, and further comprising one or more additional aspects of the exemplary embodiments of the invention as further described herein, including those mentioned above with respect to number (6).

(8) In another non-limiting, exemplary embodiment, an apparatus comprising: a receiver configured to receive a first timing parameter and a second timing parameter; and a transmitter configured to transmit a message to a first node in accordance with the first timing parameter and to transmit the message to a second node in accordance with the first timing parameter and the second timing parameter.

An apparatus as in the previous, where the apparatus comprises a base station, a network element, a relay station, a user equipment, a mobile node or a mobile station. An apparatus as in any above, further comprising at least one processor. An apparatus as in any above, further comprising at least one antenna. An apparatus as in any above, further comprising one or more additional aspects of the exemplary embodiments of the invention as further described herein, including those mentioned above with respect to number (6).

(9) In another non-limiting, exemplary embodiment, an apparatus comprising: first means for receiving a first timing parameter; second means for receiving a second timing parameter; first means for transmitting a message to a first node in accordance with the first timing parameter; and second means for transmitting the message to a second node in accordance with the first timing parameter and the second timing parameter.

An apparatus as in the previous, further comprising: third means for receiving a broadcast message from the second node; and third means for transmitting a response message to the second node in response to the third means for receiving receiving the broadcast message from the second node. An apparatus as in any above, further comprising: means for synchronizing a clock of the apparatus in response to the third means for receiving receiving the broadcast message from the second node. An apparatus as in any above, where the third means for receiving receives the broadcast message on a downlink synchronization channel. An apparatus as in any above, where the first means for receiving and the second means for receiving comprise at least one receiver, where the first means for transmitting and the second means for transmitting comprise at least one transmitter. An apparatus as in any above, where the apparatus comprises a base station, a network element, a relay station, a user equipment, a mobile node or a mobile station. An apparatus as in any above, further comprising means for processing. An apparatus as in the previous, where the means for processing comprises at least one processor. An apparatus as in any above, further comprising one or more additional aspects of the exemplary embodiments of the invention as further described herein, including those mentioned above with respect to number (6).

(10) In another non-limiting, exemplary embodiment, an apparatus comprising: first receiver circuitry configured to receive a first timing parameter; second receiver circuitry configured to receive a second timing parameter; first transmission circuitry configured to transmit a message to a first node in accordance with the first timing parameter; and second transmission circuitry configured to transmit the message to a second node in accordance with the first timing parameter and the second timing parameter.

An apparatus as in the previous, further comprising: third receiver circuitry configured to receive a broadcast message from the second node; and third transmission circuitry configured to transmit a response message to the second node in response to the third receiver circuitry receiving the broadcast message from the second node. An apparatus as in any above, further comprising: synchronization circuitry configured to synchronize a clock of the apparatus in response to the third receiver circuitry receiving the broadcast message from the second node. An apparatus as in any above, where the third receiver circuitry receives the broadcast message on a downlink synchronization channel. An apparatus as in any above, where the apparatus comprises a base station, a network element, a relay station, a user equipment, a mobile node or a mobile station. An apparatus as in any above, further comprising processing circuitry. An apparatus as in any above, further comprising one or more additional aspects of the exemplary embodiments of the invention as further described herein, including those mentioned above with respect to number (6).

Figure 10:
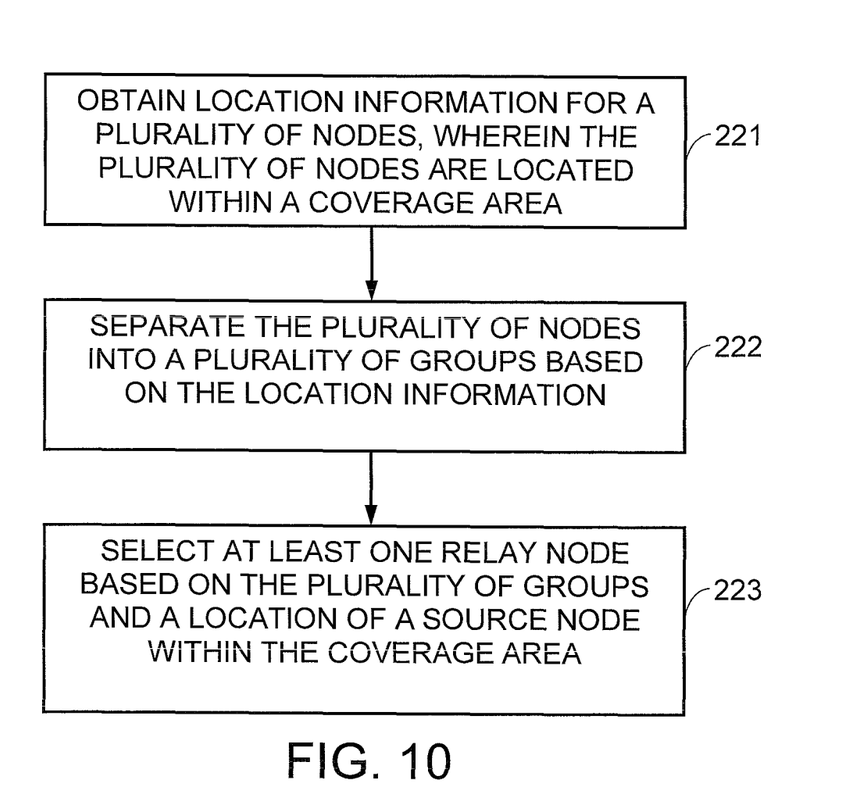
FIG. 10 depicts a flowchart illustrating one non-limiting example of a method for practicing the exemplary embodiments of this invention.

(11) In another non-limiting, exemplary embodiment, and as illustrated in FIG. 10, a method comprising: obtaining location information for a plurality of nodes, wherein the plurality of nodes are located within a coverage area (221); separating the plurality of nodes into a plurality of groups based on the location information (222); and selecting at least one relay node based on the plurality of groups and a location of a source node within the coverage area (223).

A method as in the previous, further comprising: transmitting information indicative of the selected at least one relay node to a device. A method as in any above, where the at least one relay node is selected further based on timing advance parameters of at least a portion of the plurality of nodes. A method as in any above, further comprising: transmitting, by the destination node, timing advance parameters of first nodes in a first group of the plurality of groups to the first nodes. A method as in any above, further comprising: transmitting an identification of the selected at least one relay node to the source node. A method as in any above, where the destination node comprises a base station, a network element, a relay station, a user equipment, a mobile node or a mobile station. A method as in any above, where the at least one relay node is selected in order to enable communications transmitted by the source node and the relay node to arrive at the destination node substantially at a same time.

A method as in any above, where the method is performed by a destination node. A method as in any above, where the method is performed by a base station, a network element, a relay station, a user equipment, a mobile node or a mobile station A method as in any above, where the method is performed by a second node and where the plurality of nodes and the second node comprise nodes of a wireless communication system. A method as in the previous, where the wireless communication system comprises one of an E-UTRAN, a WLAN or a Bluetooth® system. A method as in any above, further comprising: receiving a communication from at least one of the nodes of the plurality of nodes. A method as in the previous, where said communication comprises a wireless communication. A method as in any above, where the method is implemented within a wireless communication system. A method as in any above, where the method is implemented within at least one cell of a wireless communication system.

A method as in any above, where the method is implemented by a computer program. A method as in any above, where the method is implemented in accordance with a program storage device readable by a machine, tangibly embodying a program of instructions executable by the machine for performing operations, said operations comprising the steps of performing the method. A method as in any above, and further comprising one or more additional aspects of the exemplary embodiments of the invention as further described herein.

(12) In another non-limiting, exemplary embodiment, a program storage device readable by a machine, tangibly embodying a program of instructions executable by the machine for performing operations, said operations comprising: obtaining location information for a plurality of nodes, wherein the plurality of nodes are located within a coverage area (221); separating the plurality of nodes into a plurality of groups based on the location information (222); and selecting at least one relay node based on the plurality of groups and a location of a source node within the coverage area (223).

A program storage device as in the previous, where the machine comprises a base station, a network element, a relay station, a user equipment, a mobile node or a mobile station. A program storage device as in any above, and further comprising one or more additional aspects of the exemplary embodiments of the invention as further described herein, including those mentioned above with respect to number (11).

(13) In another non-limiting, exemplary embodiment, an apparatus comprising: a processor configured to obtain location information for a plurality of nodes, wherein the plurality of nodes are located within a coverage area, to separate the plurality of nodes into a plurality of groups based on the location information, and to select at least one relay node based on the plurality of groups and a location of a source node within the coverage area; and a transmitter configured to transmit the selected at least one relay node to another device.

An apparatus as in the previous, where the apparatus comprises a base station, a network element, a relay station, a user equipment, a mobile node or a mobile station. An apparatus as in any above, further comprising a receiver. An apparatus as in any above, further comprising at least one antenna. An apparatus as in any above, further comprising one or more additional aspects of the exemplary embodiments of the invention as further described herein, including those mentioned above with respect to number (11).

(14) In another non-limiting, exemplary embodiment, an apparatus comprising: means for obtaining location information for a plurality of nodes, wherein the plurality of nodes are located within a coverage area; means for separating the plurality of nodes into a plurality of groups based on the location information; and means for selecting at least one relay node based on the plurality of groups and a location of a source node within the coverage area.

An apparatus as in the previous, further comprising: means for transmitting an identification of the selected at least one relay node to another device. An apparatus as in the previous, where the means for transmitting comprises a transmitter. An apparatus as in any of the above, where the means for obtaining, the means for separating and the means for selecting comprise at least one processor. An apparatus as in any above, where the means for selecting at least one relay node is further based on timing advance parameters of at least a portion of the plurality of nodes. An apparatus as in any above, further comprising: means for transmitting timing advance parameters of first nodes in a first group of the plurality of groups to the first nodes. An apparatus as in any above, where the apparatus comprises a base station, a network element, a relay station, a user equipment, a mobile node or a mobile station. An apparatus as in any above, further comprising means for receiving. An apparatus as in the previous, where the means for receiving comprises at least one receiver. An apparatus as in any above, further comprising one or more additional aspects of the exemplary embodiments of the invention as further described herein, including those mentioned above with respect to number (11).

(15) In another non-limiting, exemplary embodiment, an apparatus comprising: location circuitry configured to obtain location information for a plurality of nodes, wherein the plurality of nodes are located within a coverage area; separation circuitry configured to separate the plurality of nodes into a plurality of groups based on the location information; and selection circuitry configured to select at least one relay node based on the plurality of groups and a location of a source node within the coverage area.

An apparatus as in the previous, further comprising: transmission circuitry configured to transmit an identification of the selected at least one relay node to another device. An apparatus as in any above, where selection by the selection circuitry is further based on timing advance parameters of at least a portion of the plurality of nodes. An apparatus as in any above, further comprising: transmission circuitry configured to transmit timing advance parameters of first nodes in a first group of the plurality of groups to the first nodes. An apparatus as in any above, where the apparatus comprises a base station, a network element, a relay station, a user equipment, a mobile node or a mobile station. An apparatus as in any above, further comprising means for receiving. An apparatus as in the previous, where the means for receiving comprises at least one receiver. An apparatus as in any above, further comprising one or more additional aspects of the exemplary embodiments of the invention as further described herein, including those mentioned above with respect to number (11).

The exemplary embodiments of the invention, as discussed above and as particularly described with respect to exemplary methods, may be implemented as a computer program product comprising program instructions embodied on a tangible computer-readable medium. Execution of the program instructions results in operations comprising steps of utilizing the exemplary embodiments or steps of the method.

The exemplary embodiments of the invention, as discussed above and as particularly described with respect to exemplary methods, may be implemented in conjunction with a program storage device readable by a machine, tangibly embodying a program of instructions executable by the machine for performing operations. The operations comprise steps of utilizing the exemplary embodiments or steps of the method.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

While the exemplary embodiments have been described above in the context of the E-UTRAN (UTRAN-LTE) system, it should be appreciated that the exemplary embodiments of this invention are not limited for use with only this one particular type of wireless communication system, and that they may be used to advantage in other wireless communication systems.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the invention. However, various modifications and adaptations may become apparent to those skilled in the relevant arts in view of the foregoing description, when read in conjunction with the accompanying drawings and the appended claims. For example, the figures and systems discussed above are presented within the context of two-dimensions. The exemplary embodiments of the invention may be utilized with a three dimensional setting, for example. However, all such and similar modifications of the teachings of this invention will still fall within the scope of this invention.

Furthermore, some of the features of the preferred embodiments of this invention could be used to advantage without the corresponding use of other features. As such, the foregoing description should be considered as merely illustrative of the principles of the invention, and not in limitation thereof.

What is claimed is:

1. A method comprising:
   determining, by a destination node, a source timing advance parameter between a source node and the destination node and a relay timing advance parameter between a relay node and the destination node, wherein the relay node is disposed between the source node and the destination node in a wireless communication system;
   transmitting the determined relay timing advance parameter from the destination node to the relay node; and
   transmitting the determined source timing advance parameter and the determined relay timing advance parameter from the destination node to the source node.

2. A method as in claim 1, where the relay node comprises a mobile station.

3. A method as in claim 1, where determining comprises: broadcasting, by the destination node, a broadcast message; receiving, by the destination node, a source reply message from the source node and a relay reply message from the relay node; calculating the source timing advance parameter based on a timing of the source reply message; and calculating the relay timing advance parameter based on a timing of the relay reply message.

4. A method as in claim 1, further comprising: transmitting the source timing advance parameter to the relay node.

5. A method as in claim 1, where the source timing advance parameter and the relay timing advance parameter are determined in order to enable communications transmitted by the source node and the relay node to arrive at the destination node substantially at a same time.

6. An apparatus comprising:
   a processor and a transmitter;
   the processor configured determine a source timing advance parameter between a source node and the apparatus and a relay timing advance parameter between a relay node and the apparatus, wherein the relay node is disposed between the source node and the apparatus in a wireless communication system;
   the transmitter configured to:
      transmit the determined relay timing advance parameter to the relay node; and
      transmit the determined source timing advance parameter and the determined relay timing advance parameter to the source node.

7. An apparatus as in claim 6, wherein the apparatus further comprising
   a receiver,
   the transmitter configured to broadcast a broadcast message;
   the receiver configured to:
      receive a source reply message from the source node; and
      receive a relay reply message from the relay node;
   the processor configured to:
      calculate the source timing advance parameter based on a timing of the source reply message; and
      calculate the relay timing advance parameter based on a timing of the relay reply message.

8. An apparatus as in claim 6, wherein the transmitter is configured to transmit the source timing advance parameter to the relay node.

9. An apparatus as in claim 6, wherein the apparatus comprises a base station.

10. A method comprising:
    receiving, by a source node, a first timing advance parameter and a second timing advance parameter;

transmitting a message from the source node to a first node in accordance with the first timing advance parameter; and transmitting the message from the source node to a second node in accordance with the first timing advance parameter and the second timing advance parameter.

11. A method as in claim 10, further comprising: receiving, by the source node, a broadcast message from the second node; and responding, by the source node, to the broadcast message by transmitting a response message to the second node.

12. A method as in claim 11, further comprising: in response to receiving the broadcast message from the second node, synchronizing, by the source node, a clock of the source node.

13. A method as in claim 11, where the broadcast message is received by the source node on a downlink synchronization channel.

14. A method as in claim 10, where the source node comprises a mobile station.

15. An apparatus comprising:
a processor, a transmitter, a receiver,
the receiver configured to:
  receive a first timing advance parameter; and
  receive a second timing advance parameter;
the transmitter configured to:
  transmit a message to a first node in accordance with the first timing advance parameter; and
  transmit the message to a second node in accordance with the first timing advance parameter and the second timing advance parameter.

16. An apparatus as in claim 15,
the receiver configured to receive a broadcast message from the second node;
the transmitter configured to transmit a response message to the second node in response to receiving the broadcast message from the second node.

17. An apparatus as in claim 16,
the processor configured to synchronize a clock of the apparatus in response to receiving the broadcast message from the second node.

18. An apparatus as in claim 16,
the receiver configured to receive the broadcast message on a downlink synchronization channel.

19. An apparatus as in claim 15, where the apparatus comprises a mobile station.

* * * * *